(12) United States Patent
Laughlin et al.

(10) Patent No.: US 6,510,622 B2
(45) Date of Patent: Jan. 28, 2003

(54) WHEELED MECHANICAL MEASURING TAPE AID DEVICE

(76) Inventors: Reginald B. Laughlin, 1037 Sewall Park, Asbury Park, NJ (US) 07712; Louis N. Johnson, 18 Water St., Englishtown, NJ (US) 07726

( * ) Notice: Subject to any disclaimer, the term of this patent is extended or adjusted under 35 U.S.C. 154(b) by 34 days.

(21) Appl. No.: 09/808,890

(22) Filed: Mar. 16, 2001

(65) Prior Publication Data

US 2002/0129511 A1 Sep. 19, 2002

(51) Int. Cl.[7] ................................................. G01B 3/10
(52) U.S. Cl. ................................................ 33/770; 33/755
(58) Field of Search .......................... 33/759, 760, 770, 33/755, 757, 758, 768

(56) References Cited

U.S. PATENT DOCUMENTS

| | | | |
|---|---|---|---|
| 4,890,393 A | * | 1/1990 | St. Jean .......................... 33/42 |
| 5,214,859 A | | 6/1993 | Buhler |
| 5,231,769 A | | 8/1993 | Mahan |
| 5,425,181 A | | 6/1995 | Calvert |
| 5,743,021 A | * | 4/1998 | Corcoran ....................... 33/762 |
| 5,782,007 A | * | 7/1998 | Harris ......................... 33/27.03 |
| 6,223,443 B1 | * | 5/2001 | Jacobs ......................... 33/27.03 |
| 6,264,029 B1 | * | 7/2001 | Motson ....................... 206/320 |
| 6,349,483 B1 | * | 2/2002 | Dodge, Sr. .................... 33/758 |
| 6,389,709 B1 | * | 5/2002 | Lunde ........................... 33/292 |
| 6,402,131 B1 | * | 6/2002 | Baculy ......................... 269/147 |

* cited by examiner

*Primary Examiner*—Diego Gutierrez
*Assistant Examiner*—Yaritza Guadalupe

(57) ABSTRACT

A device attached to the tag end of a retractable measuring tape extends the range of measurement achievable, increases the ease of operation of the measuring tape over rough surfaces and betters the operator's safety of measuring elevated or angled surfaces. The measuring tape aid contains two wheels on an inner axle. The outer channels, one fixed and one moveable, each contain one half of the clamping device that will attach to the retractable measuring tape. The moveable half of the clamping device is held in place via an internal compression spring. The use of this device permits tradesmen and do-it-yourselfers the ability to extend the range of operation of most brands of retractable metal tape measures.

8 Claims, 4 Drawing Sheets

WHEELED MECHANICAL MEASURING TAPE AID DEVICE

BACKGROUND OF THE INVENTION

1. Field of the Invention

The present invention relates to generic mechanical measuring tape devices used in the construction trades and allied and non-allied fields. In particular, a wheeled mechanical measuring tape aid device can be clamped onto the tape measure by spreading the halves and letting them close onto a partially extended tape. Once attached, it provides a wider range of one-person uses than otherwise achievable. The end of the tape may be wheeled across many surfaces by extending the tape from its housing.

The operator remains in one place yet obtains an accurate measurement to a point some distance away. In other measuring tasks the operator may roll the tag end of the tape measure under large hard-to-move objects. In still other measuring tasks the operator may measure roofs or other angled surfaces from a safe location greatly reducing risk to self.

2. Description of Related Art

Though there are some devices attaching to the end, side or body of retractable mechanical measuring tapes none contain wheeled apparatus or anything similar in appearance or operation.

SUMMARY OF THE INVENTION

It is a general purpose of the use of the wheeled mechanical measuring tape aid to expand the use and versatility of the conventional mechanical measuring tape device—those having an internal spring operated return mechanism and a clip or hook on the leading tag end. By attaching the wheeled measuring tape aid to a conventional measuring tape, a construction worker, e.g., roofer, carpenter, etc. or a trades person, e.g., interior designer, trade show exhibitor, can easily extend the tape measure and obtain accurate measurements over the most challenging of surfaces. The measuring aid is designed to easily and quickly attach and detach to the mechanical tape measure as will be described in more detail in the preferred embodiment of the invention hereinbelow. The wheeled mechanical measuring tape aid is of a one-size-fits-all configuration so that it may attach to all of the mechanical measuring tapes on the market today and in the foreseeable future. The aid has one moving part to attach to the mechanical tape measure and is held in place by a quality compression spring thereby giving the device an excellent life span in the rigorous construction industries. The aid is compact in design as can be seen in the drawings herewith submitted enabling it to be carried in a belt pouch or in the attache case of any tradesperson. With the wheeled mechanical measuring tape aid device attached to the measuring tape the operator may stand upon the ground, extend the tape measure over the gutter of a one-story building, and run the tape up the entire width of the roof to its peak. Subtract the distance from the operator to the roof edge and the result will be an accurate measurement of the roof. Similarly, any roof may be measured from its edge without the operator climbing out on the roof. In other measuring tasks a carpenter may locate room dimensions or window openings without changing his or her location. Discussions with the general contractor or homeowner continue uninterrupted. Additionally an operator may measure for flooring or carpet directly under large furniture or built-ins and obtain accurate measurements without moving those objects. In each instance the operator can make the measurements without an assistant drawing out the tape, without the tape end becoming hung up on an edge or irregularity and with the most comfort and safety to his or herself.

It is an object of this invention to make the use of the conventional mechanical measuring device more versatile.

It is another object of this invention to make the user of the conventional mechanical measuring device safer.

It is yet another object of this invention to permit the tradesperson to use the conventional mechanical measuring device beyond his or her natural reach.

It is still another object of this invention to permit the use of the conventional mechanical measuring tape device beyond its normal flexing limit.

Finally it is another object of this invention to make certain measuring tasks easier by utilizing the wheeled rolling of the tag end over uneven surfaces.

The foregoing objectives, features and advantages together with other objectives, features and advantages will become more apparent from the following more detailed description of the invention, as illustrated in the accompanying drawings in which reference numerals refer to like parts throughout the different views. The drawings are schematic and not necessarily to scale, emphasis being placed upon illustrating principals of the invention.

DESCRIPTION

DETAILED DESCRIPTION OF THE PREFERRED EMBODIMENT

Figure 1:
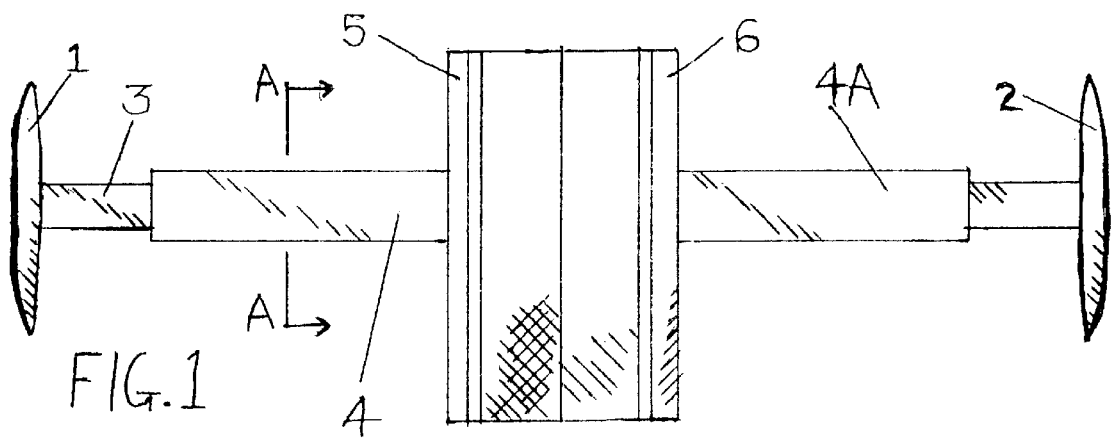
FIG. 1 is a plan view of a current embodiment of a wheeled mechanical measuring tape aid device showing Section A indication.
Figure 2:
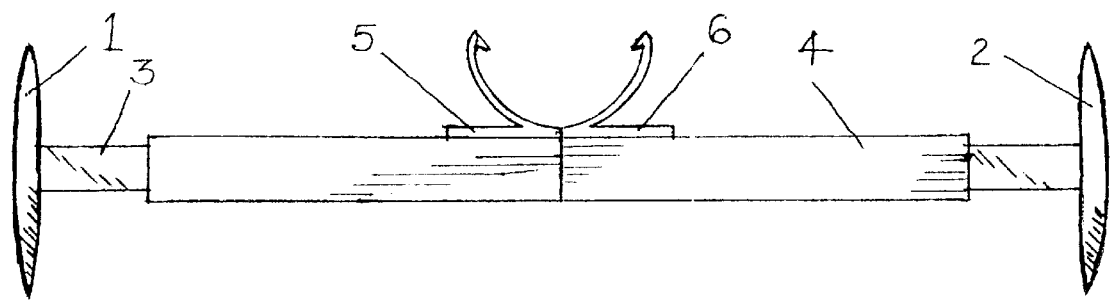
FIG. 2 is a front view of a wheeled mechanical measuring tape aid device.

Referring to FIGS. 1 & 2 there is a distance between the two wheels 1 & 2 of approximately 6". Each wheel is attached to the axle pin receiving block 10 & 11 (shown later in detailed drawings FIGS. 5, 6, 7, 8 & 9) which is attached to the 'L' channel axle 3. The 'L' channel runs the entire width of the invention. The tape clamp halves 5 & 6 are attached to their respective box channels 4 & 4A. The clamping mechanism is further explained in later drawings and descriptions.

Figure 3:
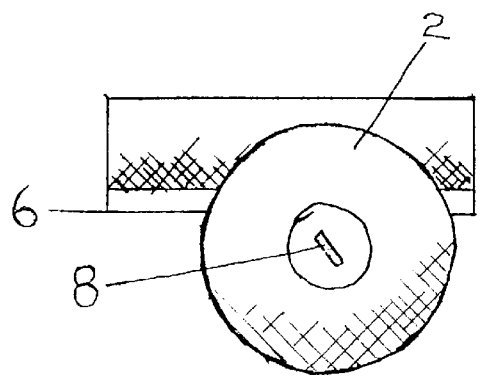
FIG. 3 is a side view of a wheeled mechanical measuring tape aid device.
Figure 4:
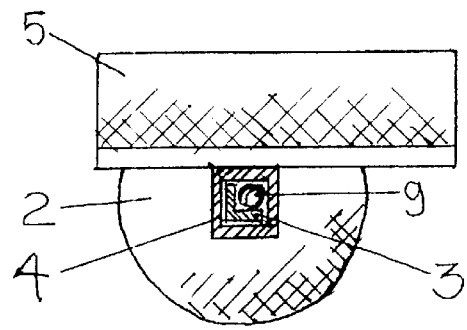
FIG. 4 is a section view showing relative placement of compression spring, L channel axle and tape clamp half.

Referring to FIGS. 3 & 4, the side view FIG. 3 of an earlier axle pin 8 and the overall relationship of the actual length of the tape measure clamp half 6. Placement of the tape measure clamp halves 5 & 6 onto the box channel 4 & 4A and axle assembly 3 is critical at ½" or greater backset to permit accurate measurements to the end of the retractable tape (shown attached in a later drawing). FIG. 4 (Section A—A) depicts the internal location of the compression spring 9 placed to ride freely along the 'L' channel axle 3 and between blocks (not seen) within box channel 4. Wheel 2 is also seen as not extending beyond tape clamp half 5. The operation of the each tape clamp halves 5 & 6 will become clearer in examples given hereinafter.

Figure 5:
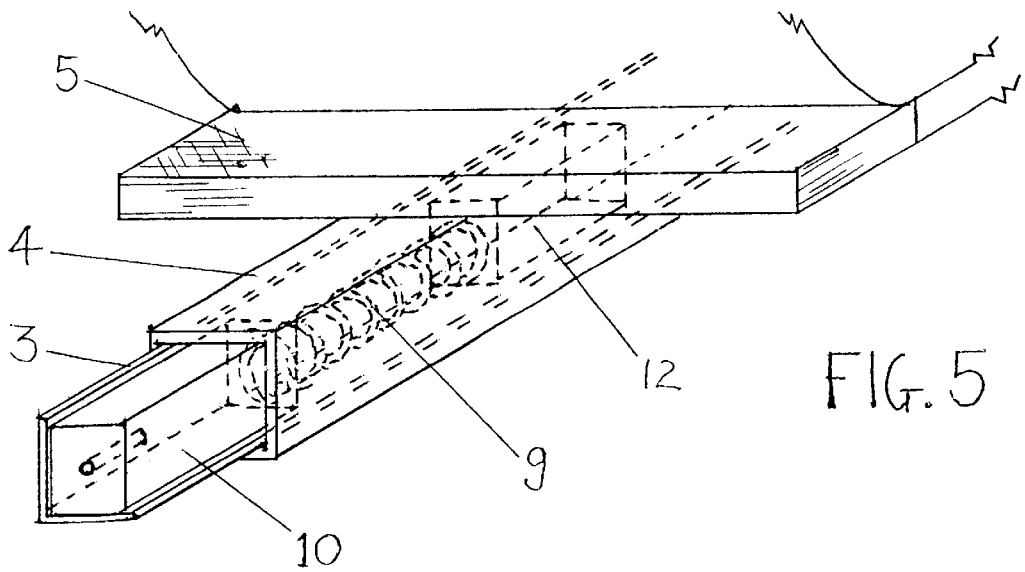
FIG. 5 is a perspective detail with transparencies showing relative placement of axle pin retaining block, compression spring and spring retainer block.

Referring now to FIG. 5 the internal compression spring 9 can be seen in transparency resting between the left axle pin receiving block 10 similarly attached to 'L' axle 3 and the spring retainer block 12 that is attached to the interior of left box channel 4. This fully conceals the internal compression spring 9 from dust and construction dirt as it is the key operating piece to hold the preferred embodiment onto the tag end of retractable tape measures. The left half of the tape clamp 5 and the spring retainer block 12 on opening compress the compression spring 9 against the left axle pin receiving block 10 enabling the insertion of the retractable tape measure in the space between the tape clamp halves 5 and 6.

Figure 6:
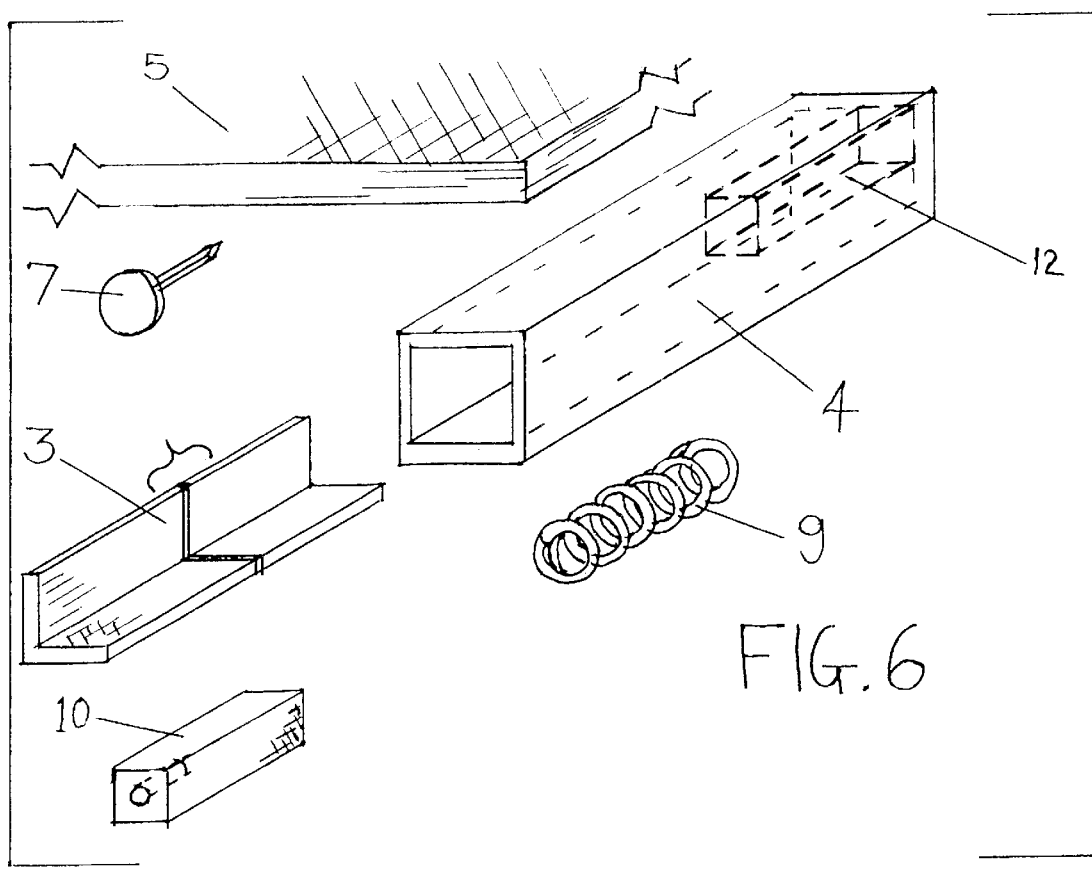
FIG. 6 is an exploded view showing attachment of spring retainer block to tape clamp channel.

Now referring to FIG. 6 (an exploded view) the relationship of the spring retainer block 12 being attached to the upper right side of the box channel 4 as viewed from side of wheel 1 (not shown), the free riding internal cornpression spring 9 and the left axle pin receiving block 10, being attached to the end of the 'L' axle 3, can be seen thereby enabling the sliding of the left tape clamp half 5 attached to the box channel 4. The left axle pin 7 serves to attach the wheel (not shown) and is not part of the clamping system.

Figure 7:
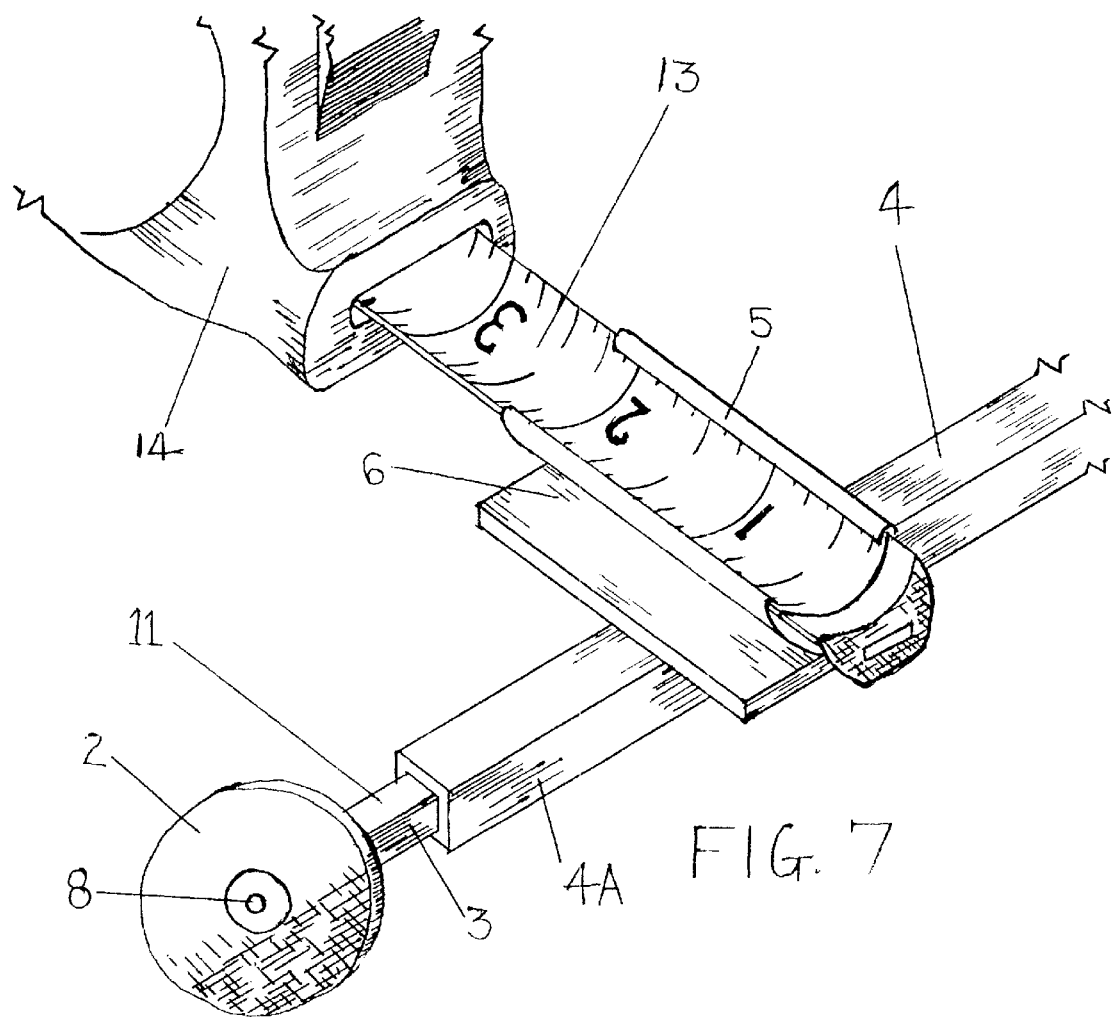
FIG. 7 is a perspective showing the wheeled mechanical measuring tape aid device attached to a conventional tape measure for operation.

FIG. 7 shows this preferred embodiment of the invention (parts 2, 3, 4, 4A, 11 & 8 in this detail) as they are attached to the tag end 13 of a retractable mechanical tape measure 14. The tape is extended outward with the invention attached to the tag end 13 thereby rolling over varied terrain or along long objects to be measured. The positioning of the very end of the tape within the clamp halves 5 & 6 places it beyond the rim of the wheel 2 permitting accurate measurements though operator is some distance away from the tag end of the retractable tape measure 13 with the invention attached.

Figure 8:
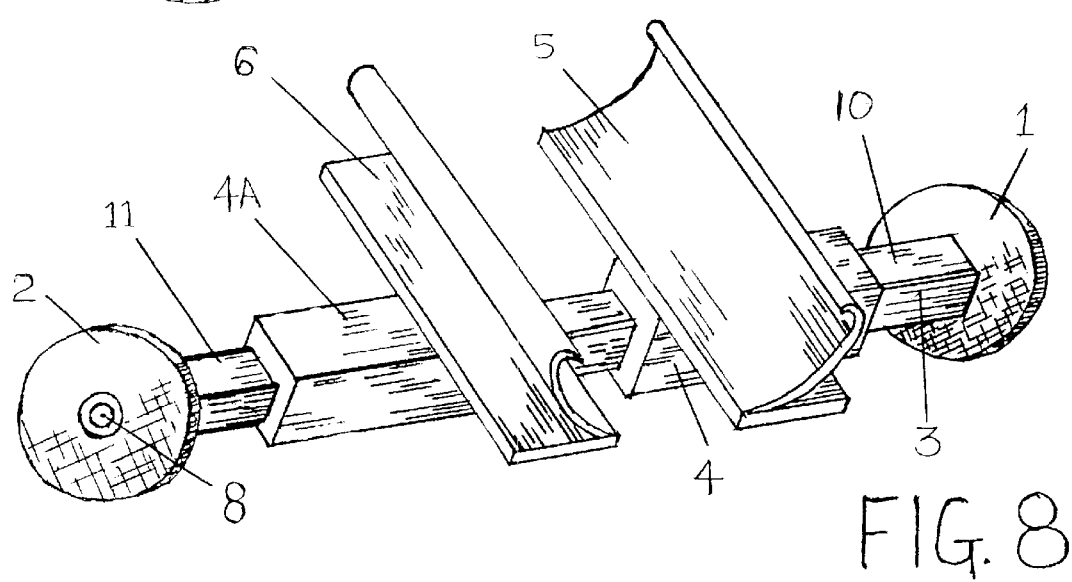
FIG. 8 is a perspective view of the wheeled mechanical measuring tape aid device open to receive conventional mechanical tape measure.

Referring to FIG. 8 the left half of the tape clamp 5 and the left box channel 4 being attached are pressed open revealing the 'L' axle running the full width of the invention. The spring 9 and spring retainer block 12 are not visible even in the open position giving the invention longer life in the field by keeping dust and construction dirt from fouling compression spring 9. As shown in all details the right clamp half 6 and right box channel 4A are fixed to 'L' axle and right axle pin receiving block 11.

Figure 9:
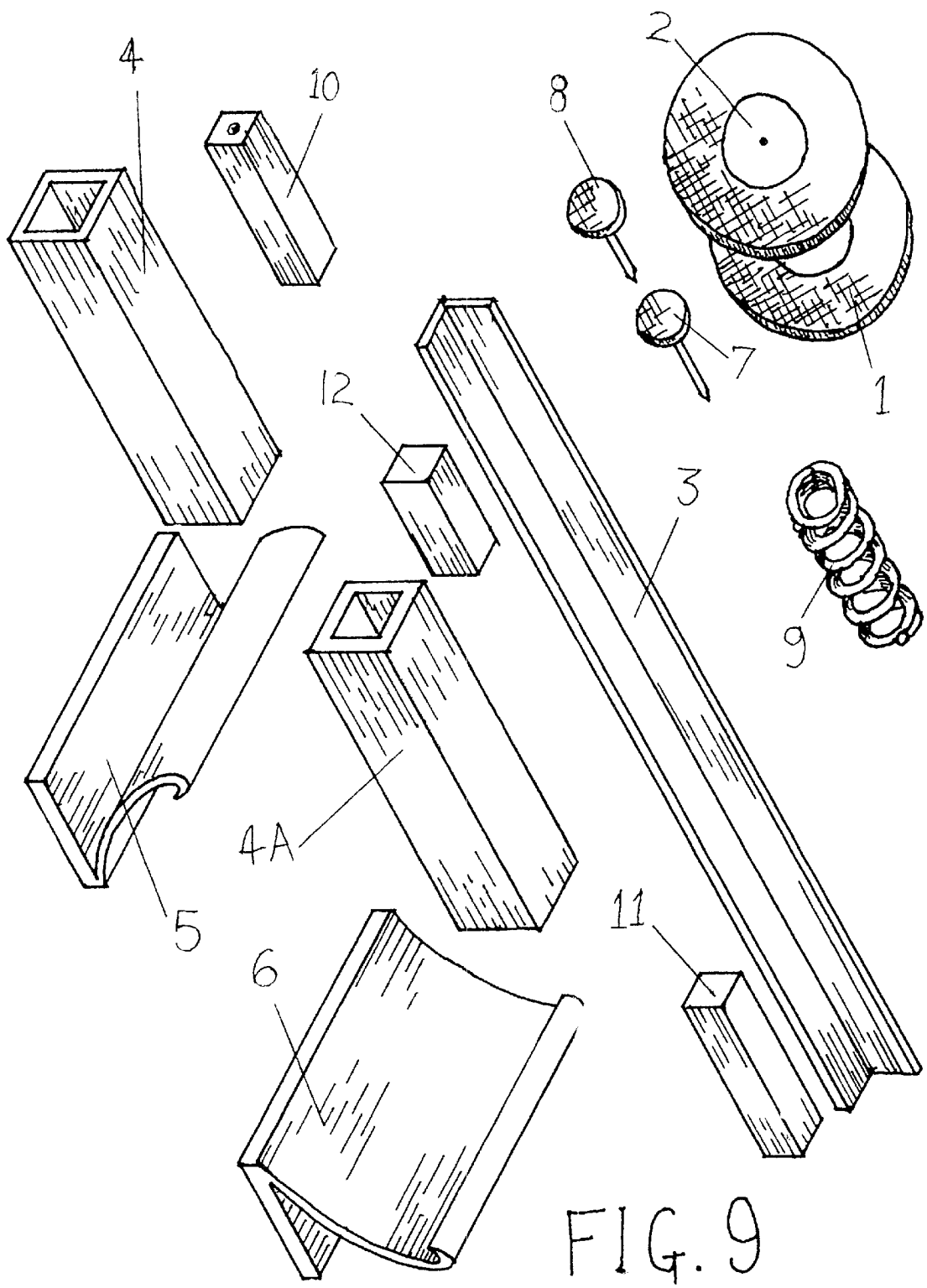
FIG. 9 is a view of the entire parts list of the wheeled mechanical measuring tap aid device to assist in manufacture.

Finally referring to FIG. 9 all parts are displayed for the manufacturing process. Spring retainer block 12 is affixed inside left box channel 4 and slid onto 'L' axle 3. Left clamp half 5, if a separate part as shown, is attached to left box channel 4. Compression spring 9 is inserted into Left box channel 4 and left axle pin receiving block 10 is affixed onto 'L' axle 3, placing compression spring in a non-visible position. Right tape clamp 6 affixed onto right box channel 4A. Right axle pin receiving block is affixed onto 'L' axle. Right clamp assembly (4A & 6) slid onto and affixed to right axle assembly (3 & 11) mating full against left clamp half assembly (4A, 5 & 12). Wheels (1 & 2) are affixed with axle pins (7 & 8).

All embodiments of this invention can be made from metal or plastic by conventional methods. This particular embodiment of the invention shows left and right tape clip halves 5 & 6 as separate pieces to be attached to the left and right box channels 4 & 4A. Another embodiment of this invention would be to mold each half as an individual piece. Hence 4 & 5 and 4A & 6 would become two individual pieces. This can be achieved by molding techniques old and well known in the art. Similarly, each axle pin receiving block 10 & 11 could be molded as one with 'L' channel axle. This would alter the assembly procedure from this embodiment of the invention as it is outlined in FIG. 9.

Also, not shown are earlier embodiments of this invention that utilized various means to latch onto the tag end of the retractable mechanical tape measure. Clip halves 5 & 6 were held together by external tension springs, rubber bands and metal clips. Though each previous embodiment did successfully enable the invention to attach to the tag end of the retractable tape measure 13, this current embodiment is the most advanced and superior. As a tool and accessory to a hand tool this embodiment is the preferred and most valuable.

The applications of this embodiment permits a single construction worker, tradesperson or do-it-yourselfer the ability to measure long distances without risking injury, such as measuring up or along roofs. The single operator can measure across rough floors, under built-ins, past obstacles and achieve an accurate result without changing location or moving large objects. The single operator can measure long runs of board or sheathing. The single operator can, with this invention perform some tasks that were heretofore not without risk to self or needed two persons to perform.

It is claimed:

1. A wheeled measuring aid device for use in combination with a retractable measuring tape, wherein the measuring aid comprises two wheels affixed to an axle, said axle having an appropriate length so as to grant stability to the device, the axle being housed within two square channels, one of said square channels being fixed upon the axle and the other of said channels being slidable upon the axle, each square channel including one half of a clamp forming a clamping mechanism that will secure said retractable mechanical measuring tape by separating said slidable square channel and returning it over the edges of a tag end of said retractable tape measure.

2. The measuring aid of claim 1 wherein each wheel is affixed to the axle via pins.

3. The measuring aid of claim 1 wherein each half of the clamping mechanism completely encompasses the central axle.

4. The measuring aid of claim 1 wherein the half of the clamping mechanism that slides upon the axle is retained in its closed position via an internal compression spring.

5. The measuring aid of claim 1 further comprises blocks affixed to the interiors of the clamping mechanism's square channels placed appropriately enabling the compression spring to be internally concealed and secured.

6. The measuring aid of claim 1 wherein the distance between each half of the clamping mechanism when closed is less than one inch across to facilitate clamping onto most retractable tape measures in the art.

7. The measuring aid of claim 1 wherein the distance between each half of the clamping mechanism when open is greater than one inch and one half inches to permit the entry of the largest mechanical retractable tape measure in the art.

8. The measuring aid of claim 1 wherein the wheels are placed such that the leading edge of the clamping device with a retractable tape measure so mounted will extend beyond said wheels.

* * * * *